March 11, 1952 J. C. RAMSEY 2,589,137
ARROWHEAD
Filed Nov. 12, 1949 3 Sheets-Sheet 2
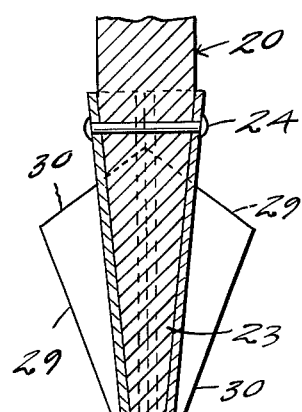
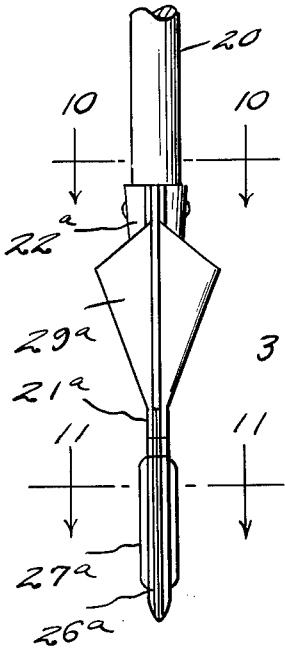
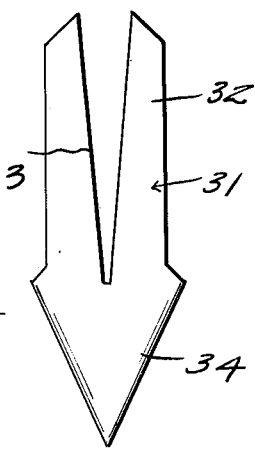
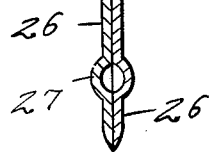
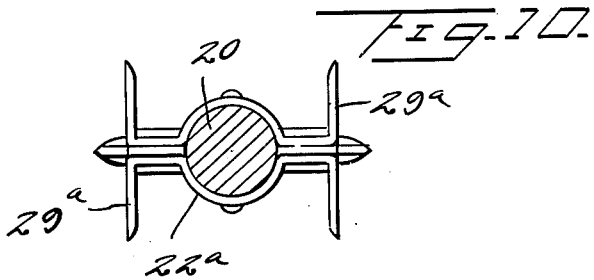
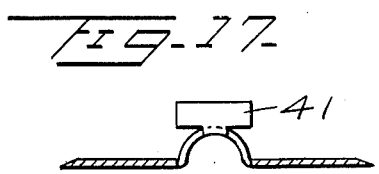
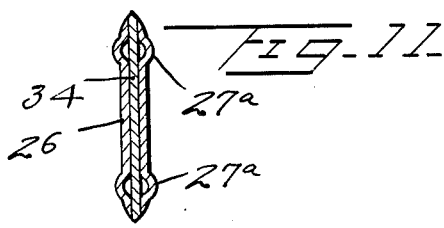
INVENTOR
James C. Ramsey
BY Kimmel & Crowell
ATTORNEYS

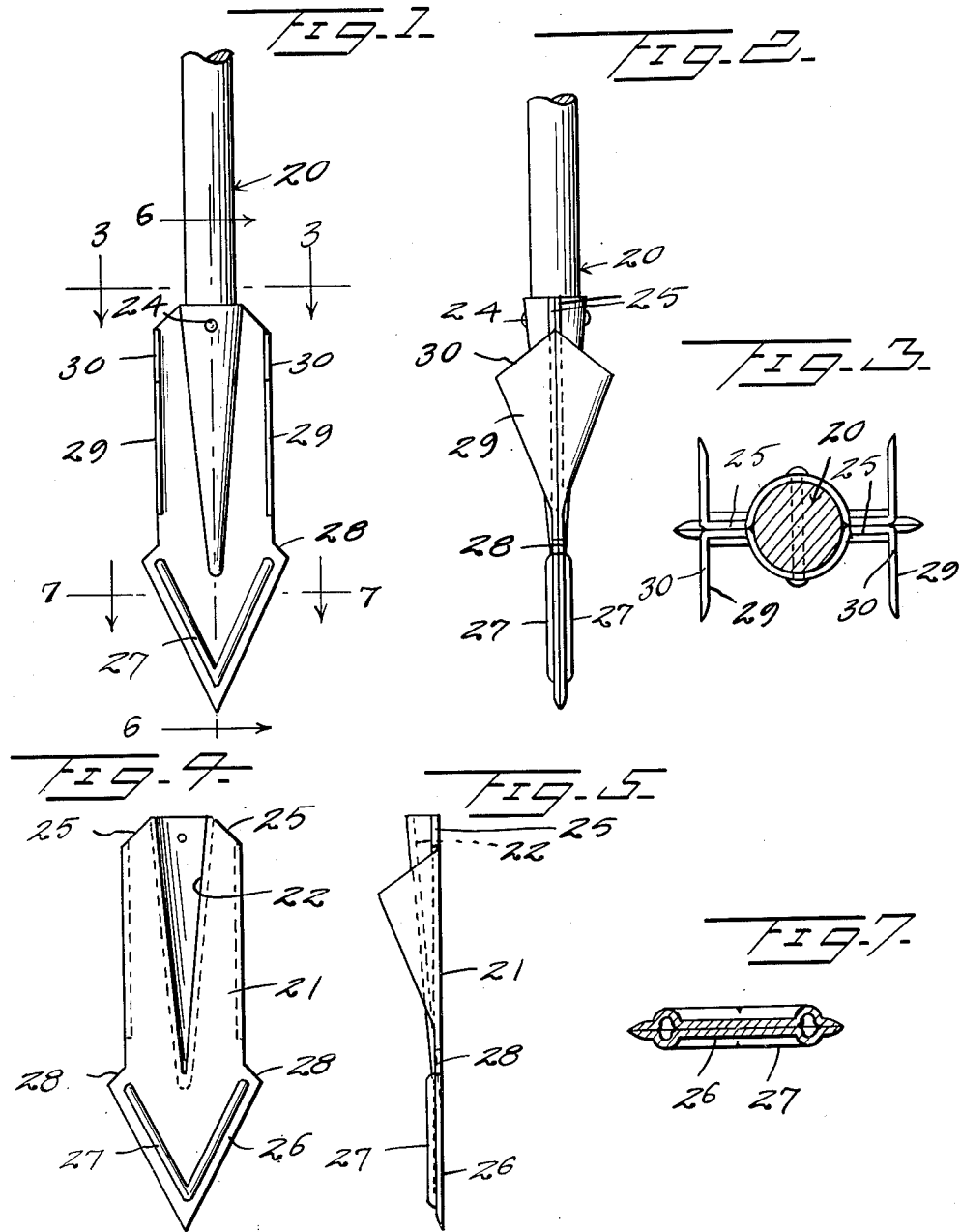

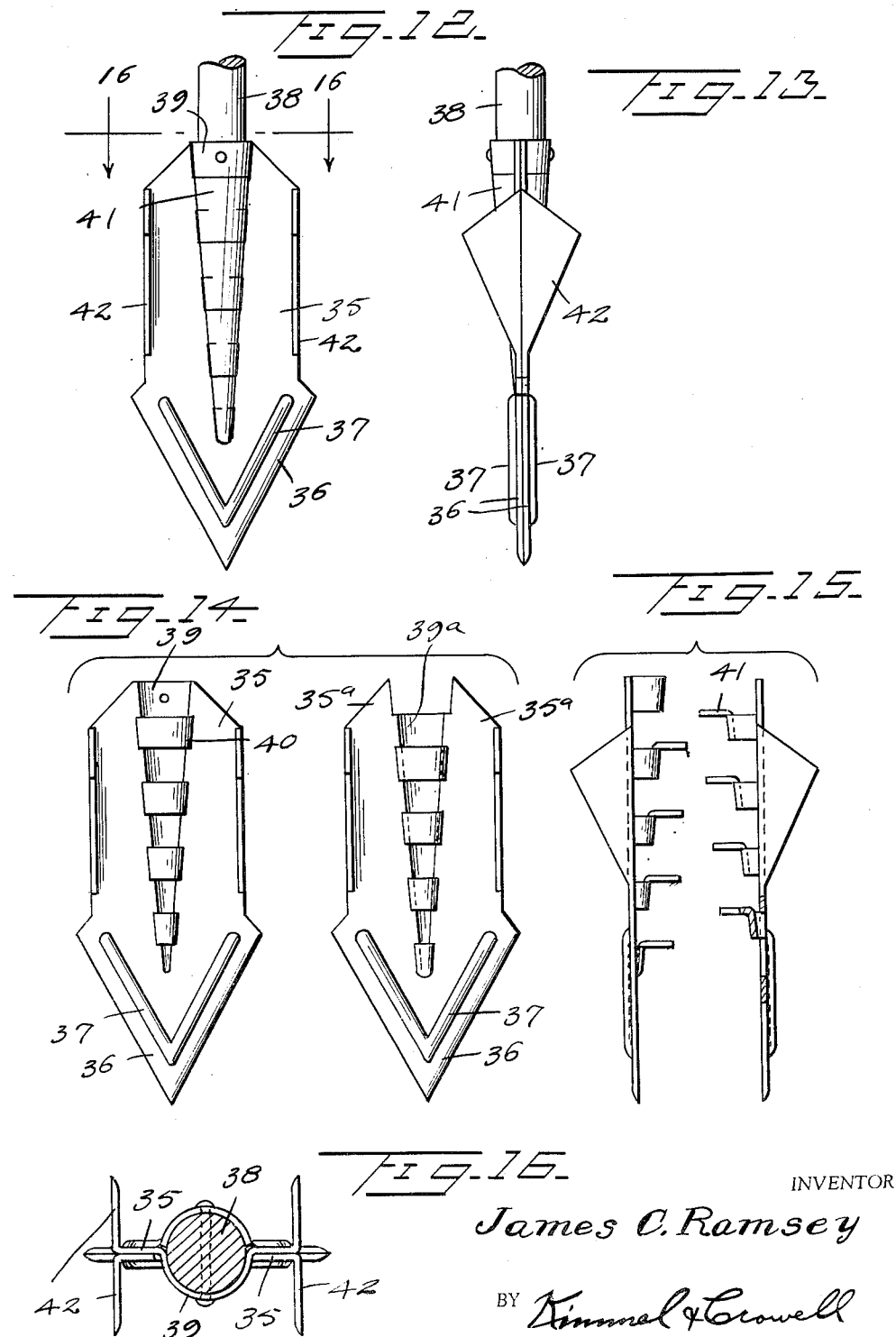

Patented Mar. 11, 1952

2,589,137

UNITED STATES PATENT OFFICE 2,589,137

ARROWHEAD

James C. Ramsey, Lincoln, N. Mex.

Application November 12, 1949, Serial No. 126,718

2 Claims. (Cl. 273—106.5)

My invention relates to an improvement in arrowheads and has for its object to provide a new and highly efficient 6-edged arrowhead especially for use in hunting large and dangerous game animals, and reference is hereby made to my previously co-pending application, Serial No. 791,830, filed December 15, 1947, now U. S. Patent No. 2,549,235, granted April 17, 1951.

A further object of the invention is to provide an arrowhead which will have greater penetrating qualities and which when passing through flesh, due to its six cutting edges, will cut three slits in such form that the wound will sag open, causing copious external as well as internal hemorrhage, thus any hit in the body of an animal will be sure to kill quickly, and the greater spillage of blood will make the trailing down and securing the wounded game much easier, which will be of much benefit to wild life conservation, as there will be no wounded animals such as deer to escape the hunter and die without being found to benefit anyone.

A still further object of my invention is to provide a simplified, economically constructed arrowhead which due to its specific form will minimize and prevent any planing or air current deflection, and will be more accurate to shoot, and at the same time more deadly when it strikes game.

A still further object is to provide an arrowhead which will be made of two identical pieces of material adhered together by suitable means to form the finished head.

A still further object of this invention is to provide a modified form of 6-edged arrowhead, whose sections will not burst apart upon impact force, but which will be drawn tighter together by the wedging pressure of a tapered arrow shaft in the tapered shaft socket formed by the meshed transverse arcuate connecting bands of each section.

With the above and other objects in view, my invention consists in the arrangement, combination and details of construction disclosed in the drawings and specification, and then more particularly pointed out in the appended claims.

In the drawings,

Figure 1 is a detail front elevation of an arrowhead constructed according to an embodiment of this invention, Figure 2 is a detail side elevation of the arrowhead, Figure 3 is a sectional view taken on the line 3—3 of Figure 1, Figure 4 is an inner side elevation of one half portion of the arrowhead, Figure 5 is an edge view of the arrowhead member shown in Figure 4, Figure 6 is a sectional view taken on the line 6—6 of Figure 1, Figure 7 is a sectional view taken on the line 7—7 of Figure 1, Figure 8 is a detail side elevation of a modification of this invention, Figure 9 is a plan view of the reinforcing member used with the structure shown in Figure 8, Figure 10 is a sectional view taken on the line 10—10 of Figure 8, Figure 11 is a sectional view taken on the line 11—11 of Figure 8, Figure 12 is a detail front elevation of another modification of this invention, Figure 13 is a detail side elevation of the arrowhead shown in Figure 12, Figure 14 is an outer side elevation of the two members making up the arrowhead shown in Figures 12 and 13, Figure 15 is an edge view partly broken away and in section, of the arrowhead forming members shown in Figure 14, Figure 16 is a sectional view taken on the line 16—16 of Figure 12, Figure 17 is a transverse sectional view of one of the arrowhead forming members shown in Figures 12 to 16.

Referring to the drawings and first to Figures 1 to 7 inclusive, the numeral 20 designates generally an elongated shaft which has mounted on the forward end thereof an arrowhead constructed according to an embodiment of this invention. The arrowhead comprises a pair of face abutting elongated plates 21 which are formed with complementary socket forming members 22 tapering downwardly and forming a conical socket within which the cone-shaped tip 23 of the shaft 20 is adapted to be secured by means of fastening devices 24.

The plates 21 are formed with bevelled upper edges 25 and are provided at their lower ends with substantially triangular points 26 which are reinforced by means of a V-shaped bead 27 which is struck outwardly from the point 26 and which has the side arms thereof parallel with the rearwardly divergent edges of the point 26. The rear end of the point 26 is bevelled as at 28 so that when the arrowhead forming members are secured together by soldering, welding or other suitable fastening means, there will be provided a substantially barbless arrowhead which can be readily withdrawn from the animal.

In order to provide a means whereby additional cuts may be formed at the point of entry of the point 26, I have provided a pair of equally spaced laterally projecting parallel wings or blades 29 on each lengthwise edge of the body or plate 21. These wings or blades 29 are of substantially triangular configuration with the hypothenuse innermost and with the wing or blade 29 disposed at right angles to the adjacent face of the body or plate 21. The rear edge 30 of the blade 29 is inclined outwardly and forwardly so as to also provide a barbless blade structure which can be readily withdrawn.

Referring now to Figures 8 to 11 inclusive, there is disclosed an arrowhead which is substantially similar to that shown in Figures 1 to 7 inclusive. The arrowhead embodied in Figures 8 to 11 inclusive includes plates 21a which are formed between the lengthwise edges thereof with socket members 22a and at their forward ends the plates or bodies 21a are formed with points 26a which are reinforced by beadings 27a of V-shape, similar to that shown in Figures 1 to 4.

The arrow herein disclosed is also provided with wings or blades 29a projecting at right angles to the plates 21a and disposed along the lengthwise parallel edges of the plates 21a. A reinforcing member generally designated as 31 is disposed between the two plates 21a and is formed of an elongated plate 32 which is provided with a V-shaped slot or opening 33 which conforms to the configuration of the socket members 22a.

The plate or body 32 is also formed with a triangular point 34 which follows the configuration of the points 26a of the plates 21a. The reinforcing member 32 is adapted to be secured between the plates 21a and the points 26a by means of welding, soldering or the like.

Referring now to Figures 12 to 17 inclusive, there is disclosed another modification of this invention. An arrowhead is formed of a pair of face abutting plates 35 which are secured together by soldering, welding or other suitable fastening means. The outer edges of the plates 35 are substantially parallel and a triangular point 36 is formed at the forward end of each plate 35. The points 36 are reinforced by outwardly struck V-shaped beading 37 which has the arms thereof disposed parallel with the adjacent edges of the point 36. In the present instance the plates 35 and 35a are locked to the shaft 38 by means of outwardly struck arcuate socket forming bands 39. The bands of each plate or body are spaced one from the other, providing a space 40 through which the band 39a of plate 35a is adapted to be extended.

Each band or socket forming member 39 and 39a has formed thereon a substantially rectangular plate 41 which is initially bent outwardly as shown in Figure 15, and after the plates have been secured together with the socket forming bands 39 and 39a projecting through the openings 40, the plates 41 are bent upwardly and are then bent transversely so as to tightly engage about the tapered end of the shaft.

The arrowhead shown in Figures 12 to 17 inclusive also includes oppositely disposed blades or wings 42 extending from the plates 35 and 35a as T-shaped extensions disposed at opposite sides of the arrowhead socket so that there will be provided six cutting edges which are adapted to cut the skin and flesh of the animal at the time the arrowhead strikes the animal. This improved arrowhead will cause a relatively large wound which will effect profuse bleeding so as to kill the animal in a relatively short time and provides a means whereby the animal may be readily tracked down by following the bloody trail.

I do not mean to confine myself to the exact details of construction herein disclosed, but claim all variations falling within the purview of the appended claims.

What I claim is:

1. An arrowhead comprising a pair of face abutting secured together plates, complementary socket members carried by said plates, a point formed at the forward end of each plate having rearwardly divergent cutting edges, a V-shaped bead formed in each point having the arms thereof rearwardly divergent and parallel with said cutting edges, a triangularly shaped blade on each longitudinal edge of each plate disposed rearwardly of said point and at right angles to the outer side of said plate, each blade being disposed parallel to the longitudinal axis of said plate, the blades of one plate being oppositely disposed with respect to the blades of the other plate.

2. An arrowhead comprising a pair of face abutting secured together plates, complementary socket members carried by said plates, a point formed at the forward end of each plate having rearwardly divergent cutting edges, a triangularly shaped blade on each longitudinal edge of each plate disposed rearwardly of said point and at right angles to the outer side of said plate, each blade being disposed parallel to the longitudinal axis of said plate, the blades of one plate being oppositely disposed with respect to the blades of the other plate.

JAMES C. RAMSEY.

REFERENCES CITED

The following references are of record in the file of this patent:

UNITED STATES PATENTS

| Number | Name | Date |
| --- | --- | --- |
| 11,391 | Stouder | July 25, 1854 |
| 1,787,683 | Innes | Jan. 6, 1931 |
| 2,182,320 | Pearson | Dec. 5, 1939 |
| 2,350,581 | Boose | June 6, 1944 |
| 2,370,270 | Trittin | Feb. 27, 1945 |
| 2,373,216 | Zwicky | Apr. 10, 1945 |
| 2,504,449 | Ramsey | Apr. 18, 1950 |

FOREIGN PATENTS

| Number | Country | Date |
| --- | --- | --- |
| 514,085 | Great Britain | Oct. 30, 1939 |